United States Patent
Boyer et al.

(10) Patent No.: US 8,905,715 B2
(45) Date of Patent: Dec. 9, 2014

(54) DAMPER AND SEAL PIN ARRANGEMENT FOR A TURBINE BLADE

(75) Inventors: Bradley Boyer, Greenville, SC (US); Matthew D. Collier, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 744 days.

(21) Appl. No.: 13/050,440

(22) Filed: Mar. 17, 2011

(65) Prior Publication Data

US 2012/0237352 A1    Sep. 20, 2012

(51) Int. Cl.
F01D 5/30 (2006.01)
F01D 5/22 (2006.01)
F01D 5/26 (2006.01)
F01D 11/00 (2006.01)

(52) U.S. Cl.
CPC .. *F01D 5/22* (2013.01); *F01D 5/26* (2013.01); *F01D 11/006* (2013.01); *Y10S 416/50* (2013.01)
USPC ...................................... 416/193 A; 416/500

(58) Field of Classification Search
CPC ....... F01D 5/303; F01D 25/06; F01D 11/005; F01D 11/006; F01D 5/00; F01D 5/10; F01D 5/16; F01D 5/26; F01D 5/22
USPC ..................... 416/190, 191, 193 A, 500, 145; 415/138, 139
See application file for complete search history.

(56) References Cited

U.S. PATENT DOCUMENTS

| | | | |
|---|---|---|---|
| 2,912,223 A | 11/1959 | Hull | |
| 4,088,421 A | 5/1978 | Hoeft | |
| 5,536,143 A | 7/1996 | Jacala et al. | |
| 5,749,705 A * | 5/1998 | Clarke et al. | 416/190 |
| 6,086,329 A | 7/2000 | Tomita et al. | |
| 6,776,583 B1 * | 8/2004 | Wang et al. | 416/220 R |
| 6,851,931 B1 | 2/2005 | Tomberg | |
| 6,857,853 B1 | 2/2005 | Tomberg et al. | |
| 6,890,150 B2 | 5/2005 | Tomberg | |
| 7,090,466 B2 | 8/2006 | Honkomp et al. | |
| 7,147,440 B2 | 12/2006 | Benjamin et al. | |
| 7,575,416 B2 * | 8/2009 | Funk et al. | 416/193 A |
| 7,600,972 B2 | 10/2009 | Benjamin et al. | |
| 7,628,588 B2 * | 12/2009 | Itzel et al. | 416/190 |
| 8,007,245 B2 | 8/2011 | Brittingham et al. | |
| 8,070,431 B2 | 12/2011 | Harter et al. | |
| 2004/0228731 A1 * | 11/2004 | Lagrange et al. | 416/210 R |
| 2006/0110255 A1 * | 5/2006 | Itzel et al. | 416/193 A |
| 2006/0177312 A1 * | 8/2006 | Tomita et al. | 416/193 A |
| 2008/0181779 A1 * | 7/2008 | Decardenas | 416/219 R |

* cited by examiner

*Primary Examiner* — Edward Look
*Assistant Examiner* — Danielle M Christensen
(74) *Attorney, Agent, or Firm* — Nixon & Vanderhye P.C.

(57) ABSTRACT

A bucket for a turbomachine rotor wheel includes an airfoil portion, a shank portion and a dovetail mounting portion, the shank portion including opposite sides, one of the sides formed with a substantially axially-oriented groove extending between forward and aft ends of the shank portion. The other one of the opposite sides is formed with at least one substantially radially-oriented groove. The substantially axially-oriented groove is adapted to receive an elongated damper pin, and the at least one substantially radially-oriented groove is adapted to receive an elongated radial seal pin.

19 Claims, 4 Drawing Sheets

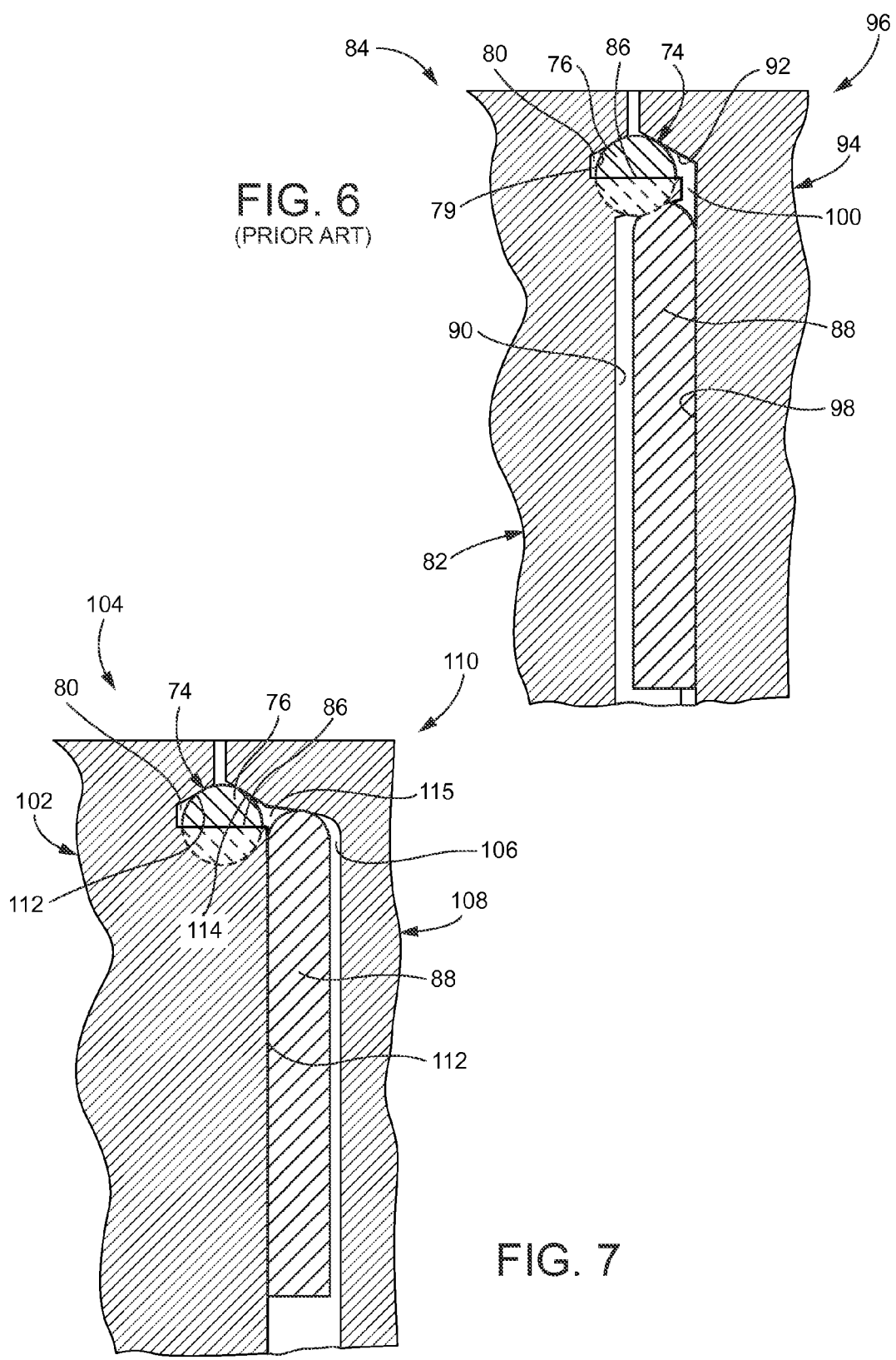

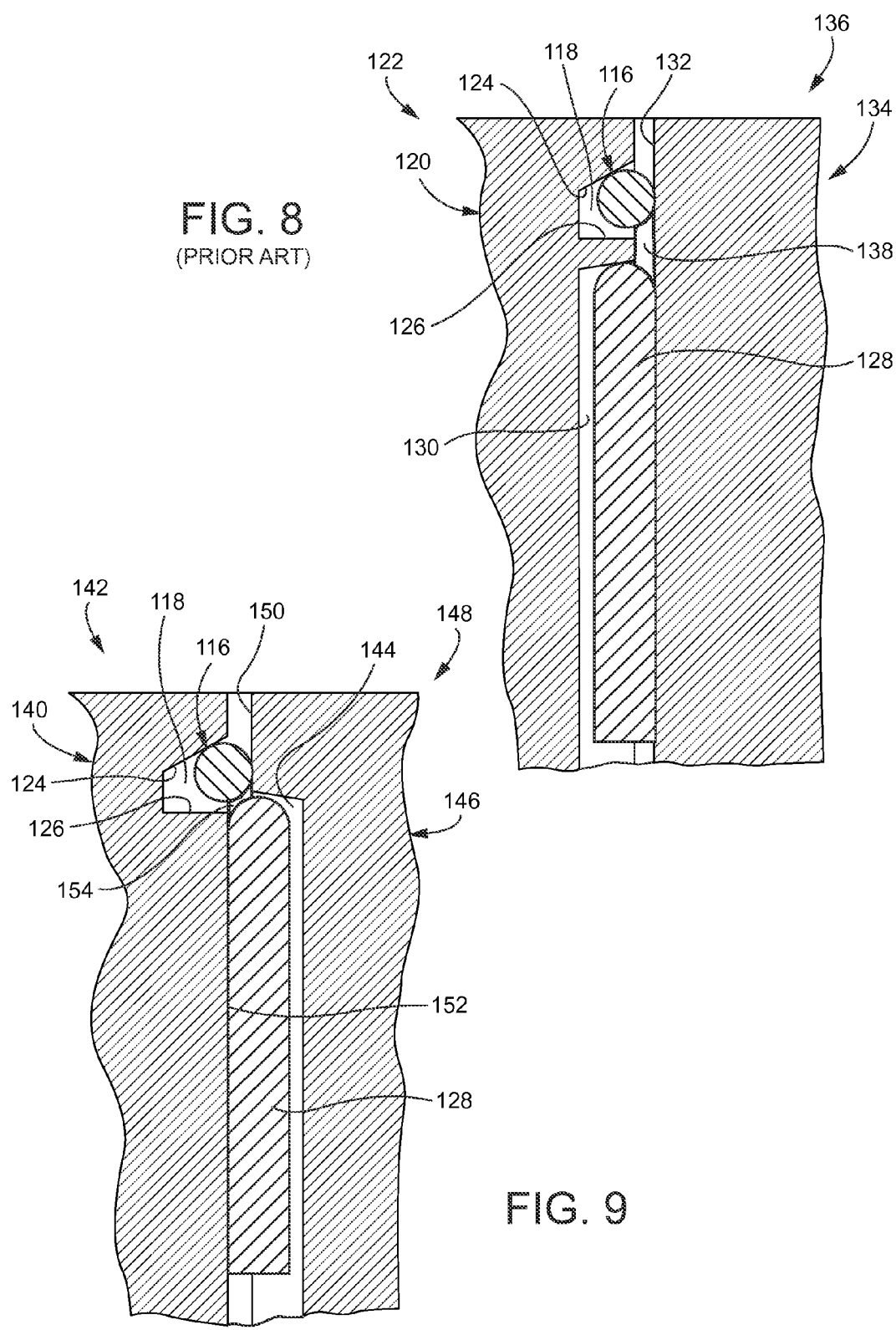

DAMPER AND SEAL PIN ARRANGEMENT FOR A TURBINE BLADE

BACKGROUND AND SUMMARY OF THE INVENTION

The present invention relates generally to turbomachines and particularly, to damper pins and seal pins disposed between adjacent buckets on a rotor wheel.

As is well known, turbines generally include a rotor comprised of a plurality of rotor wheels, each of which mounts a plurality of circumferentially-arranged buckets. The buckets each typically include an airfoil, a platform, a shank and a dovetail, the dovetail being received in mating dovetail slot in the turbine wheel. The airfoils project into a hot gas path downstream of the turbine combustors and convert kinetic energy into rotational, mechanical energy. During engine operation, vibrations are introduced into the turbine buckets and if not dissipated, can cause premature failure of the buckets.

Many different forms of vibration dampers have been proposed to minimize or eliminate vibrations. Vibration dampers are often in the form of elongated damper pins that fit between adjacent buckets and provide the damping function by absorbing harmonic stimuli energy produced as a result of changing aerodynamic loading. A damper pin is typically retained in a groove formed along one circumferentially-oriented "slash face" in the turbine blade shank region of one of each pair of adjacent buckets. The damping pin is centrifugally loaded during operation and, in order to prevent bucket-to-bucket binding, the groove must be machined so as to allow the pin to float relatively freely within the groove. At the same time, highly-compressed air is often extracted from the compressor of an axial turbine for the purpose of cooling turbine components, particularly those in the hot gas path downstream of the combustor. This cooling air is required to maintain the temperature of the turbine components at an acceptable level for operation, but comes at a cost to overall turbine efficiency and output. Any of the cooling flow that leaks out of the turbine components is essentially wasted. The pocket created by a damper pin groove provides a large leakage path for cooling flow to escape from the bucket shank region. The cooling efficiency can also be impaired by ingress of hot gas from the hot gas path into the bucket shank region.

In one prior arrangement, the damper pin has reduced-cross-section ends supported on shoulders formed in the bucket shank, with or without annular seals at the interfaces between the reduced-cross-section ends and the main body portion of the pin to minimize leakage along the damper pin groove.

For industrial gas turbines utilizing long-bucket-shank designs, a further approach to seal against cross-shank leakage is to provide radial seal pins between the shanks of adjacent buckets at the fore and aft ends of the shank, below the axially-extending damper pin. Like the damper pin, the radial seal pins are seated in seal pin grooves formed on the same slash face as the damper pin groove, and engage the substantially flat sides of the shank of the adjacent bucket. The sealing effectiveness of these cross-shank seals is an important factor in increasing the bucket life by minimizing thermal stress. Even when using both damper pins and radial seal pins, however, gaps remain between the radial seal pins and the reduced-cross-section ends of the axially-oriented damper pin, again creating readily-available leakage paths for hot combustion gases flowing past the buckets.

It would therefore be desirable to provide a more reliable sealing feature that further reduces the escape of cooling flow from a pressurized shank cavity, by reducing the gap between the axially-oriented damper pins and the radially-oriented seal pins of adjacent buckets.

BRIEF SUMMARY OF THE INVENTION

In accordance with one exemplary but nonlimiting aspect, the invention relates to a bucket pair in a turbomachine comprising: a first bucket having a first airfoil portion and a first shank portion; a second adjacent bucket having a second airfoil portion and a second shank portion adjacent the first shank portion; a substantially axially-oriented groove in the first shank portion; at least one substantially radially-oriented groove in the second shank portion; an elongated damper pin seated in the substantially axially-oriented groove in the first shank portion; and an elongated radial seal pin seated in the at least one substantially radially-oriented groove in the second shank portion.

In another exemplary but nonlimiting aspect, the invention relates to a bucket for a turbomachine rotor wheel comprising an airfoil portion, a shank portion and a dovetail mounting portion, the shank portion including opposite sides, one of said sides formed with a substantially axially-oriented groove extending between forward and aft ends of the shank portion, and the other of the sides formed with a least one substantially radially-oriented groove, the substantially axially-oriented groove adapted to receive an elongated damper pin, and the at least one substantially radially-oriented groove adapted to receive an elongated radial seal pin.

In still another exemplary but nonlimiting aspect, the invention relates to bucket and pin assembly for a turbine machine rotor wheel comprising a bucket formed with an airfoil portion, a shank portion and a dovetail mounting portion, the shank portion including opposite sides each adapted to face respective adjacent buckets when installed on a rotor wheel, one of the opposite sides of the shank portion formed with a substantially axially-oriented groove extending between forward and aft ends of the shank portion, and the other of the opposite sides formed with at least one substantially radially-oriented groove at a forward end of the bucket; an elongated damper pin seated in the substantially axially-oriented groove, and a radial seal pin located in the at least one substantially radially-oriented groove.

The invention will now be described in detail in connection with the drawings identified below.

BRIEF DESCRIPTION OF THE DRAWINGS

FIG. 6 is a schematic representation of a bucket pair incorporating a damper pin and radial seal pin arrangement in accordance with a prior configuration;

FIG. 7 is a schematic representation of a bucket pair incorporating a damper pin and radial seal pin arrangement in accordance with an exemplary but nonlimiting embodiment of this invention;

FIG. 8 is a schematic representation of a bucket pair incorporating a damper pin and radial seal pin arrangement in accordance with another prior configuration; and FIG. 9 is a schematic representation of a bucket pair incorporating a damper pin and radial seal pin arrangement in accordance with a another exemplary but nonlimiting embodiment of this invention.

DETAILED DESCRIPTION OF THE INVENTION

Figure 1:
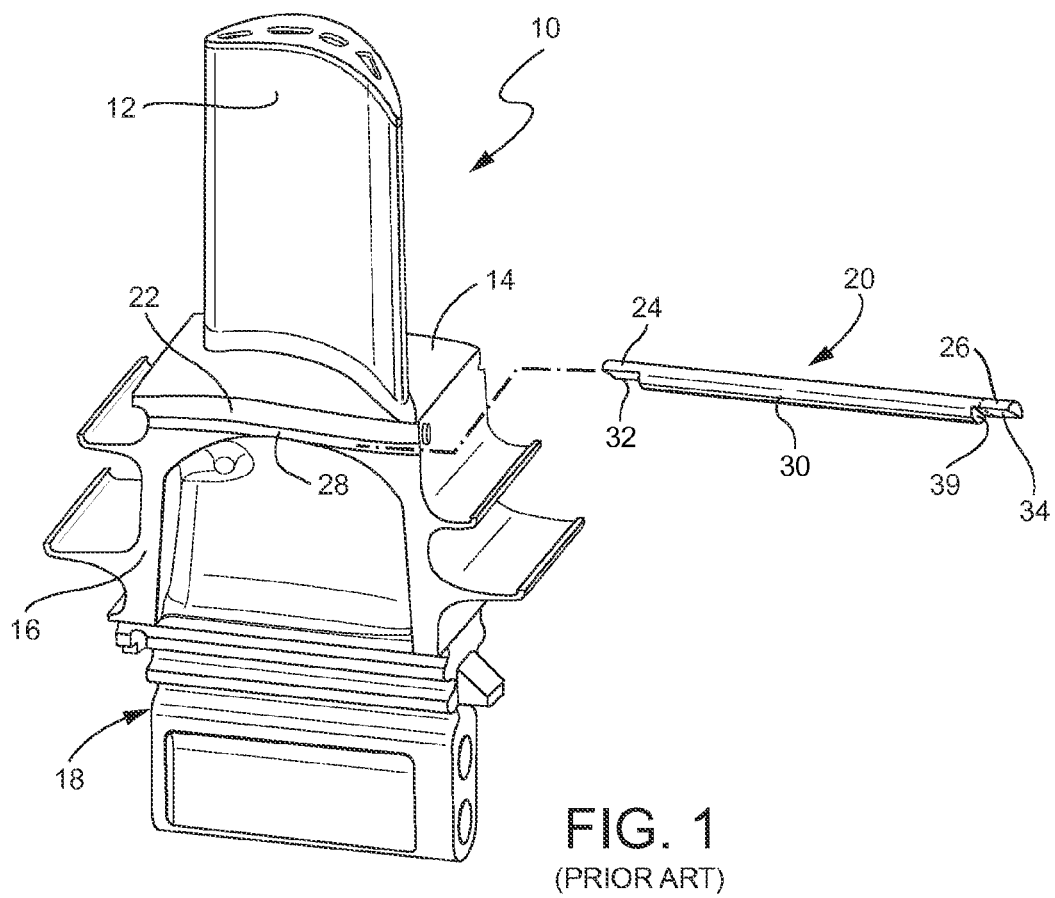
FIG. 1 is a perspective assembly view of a gas turbine bucket and damper pin.

FIG. 1 illustrates a conventional turbine blade or bucket 10 including an airfoil 12, a platform 14, a shank 16 and a dovetail 18. The dovetail 18 is utilized to secure the bucket 10 to the periphery of the rotor wheel (not shown), as is well understood in the art. A damper pin 20 is located along one axial edge (or slash face) 22 adjacent (i.e., radially inward of) the bucket platform 14 with the leading end 24 of the damper pin 20 located nearer the leading edge of the bucket, and the trailing end 26 of the damper pin located nearer the trailing edge of the bucket.

Figure 2:
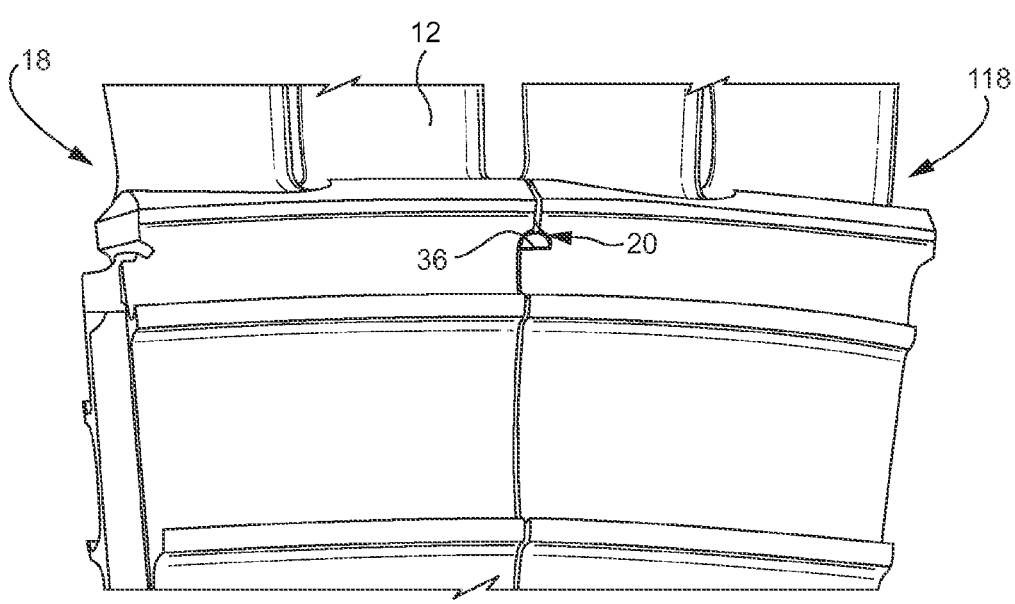
FIG. 2 is a partial side elevation showing a pair of circumferentially-adjacent buckets with a damper pin located therebetween.

It will be appreciated that a similar pin 20 is located between each adjacent pair of buckets 18, 118 on the turbine wheel, as apparent from FIG. 2. Specifically, the damper pin 20 is located in a groove 28 (FIG. 1) extending along the entire slash face 22 of the bucket 118. The damper pin 20 may include a substantially cylindrical body portion 30 between a pair of substantially semi-cylindrical, opposite ends 24, 26 interfacing at shoulders 39. This configuration creates flat support surfaces 32, 34 (best seen in FIG. 1) that are adapted to rest on the machined bucket platform surfaces or shoulders (not shown in FIG. 1 but one shown at 36 in FIG. 2) at opposite ends of the groove 28 formed in the bucket slash face, thereby providing good support for the pin while preventing undesirable excessive rotation during machine operation.

Figure 3:
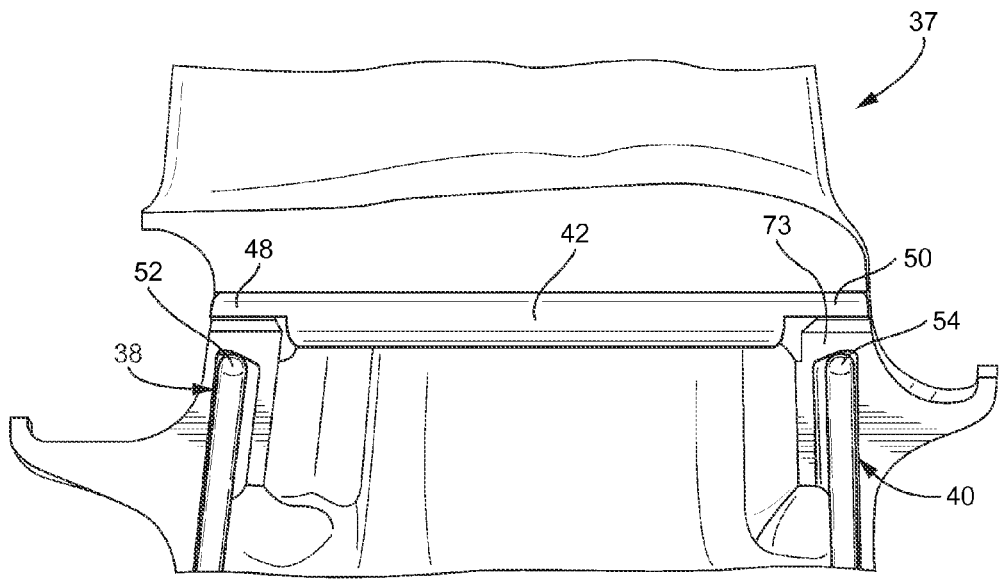
FIG. 3 is a partial perspective view of another gas turbine bucket and damper pin assembly, where the damper pin and radial seal pins are located on the same side of the bucket shank.

FIG. 3 illustrates a bucket 37 with a long bucket shank where radially-oriented seal pins 38, 40 are used in combination with a damper pin 42. Note, however, that there is still a considerable gap between the radially outer ends 52, 54 of the seal pins 38, 40 and the ends 48, 50 of the damper pin 42. Note also that the groove or slot 18 in which the damper pin is located is open at both ends, allowing cooling air to escape through the clearance spaces between the pin and the groove in which it is seated, especially along the reduced-cross-section ends 48, 50.

It should be understood that in these prior arrangements, the grooves in which the damper pin 42 and radial seal pins 38, 40 are seated are provided on only one side of the bucket, and that they engage flat surfaces on an adjacent bucket. In other words, each bucket in a circumferential row of buckets is formed such that the damper pin/seal pins seated in grooves formed on one side of a bucket engage flat surfaces of an opposite side of an adjacent bucket.

In accordance with an exemplary but nonlimiting aspect of this invention, it has been discovered that the leakage path between the damper pins and radial seal pins can be reduced by relocating the radial seal pins to the opposite side of the bucket. Thus, with reference to FIGS. 4 and 5, a modified bucket 56 (having an airfoil portion 12 and dovetail mounting portion 18) includes opposite sides 58, 60 of the shank portion 62. Side 58 is formed to include a substantially axially-oriented damper pin groove 64 that is substantially similar to the damper pin groove 28, with flat support surfaces 66, 68 at opposite ends, adapted to receive the damper pin 20, with reduced cross-section ends 24, 26 adapted to seat on the support surfaces 66, 68. As explained in a connection with FIG. 7, there is a flat surface 112 radially inward of the axially-oriented groove. The opposite side 60 of the shank portion 62 is formed with radial seal pin grooves 70, 72, that are adapted to receive radial seal pins similar to those shown at 38, 40. By separating the damper pin groove from the radial seal pin grooves in the bucket shank portion, the need for a structural ligament as at 73 in FIG. 3, between the damper pin groove and each of the radial seal pin grooves is eliminated. This, in turn, allows the radial seal pins to be located closer to the damper pin as is evident from a comparison of the schematic representations in FIGS. 7 and 9 as explained below.

Figure 4:
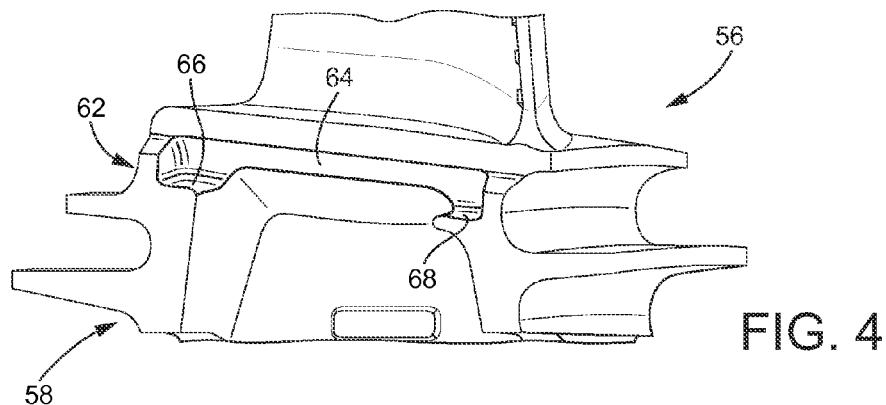
FIG. 4 is a partial perspective view of a bucket shank formed with a damper pin groove on one side of the bucket shank in accordance with an exemplary embodiment of the invention.
Figure 5:
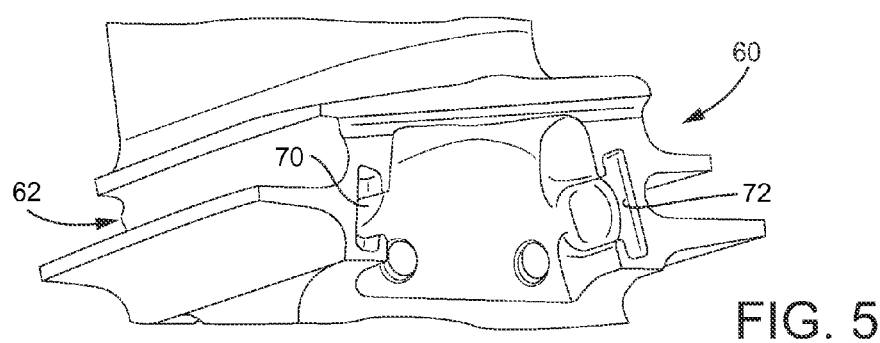
FIG. 5 is a partial perspective view of an opposite side of the bucket shank shown in FIG. 4, with radial seal pin grooves formed in the opposite side of the bucket shank.

FIG. 6 shows a prior configuration for a bucket pair where a damper pin 74 having a round cross-sectional shape with reduced cross-sectional ends (one shown at 76) is relatively loose seated in a substantially axially-oriented groove 80 formed in the shank portion 82 of a first bucket 84 (similar to groove 64 in FIG. 4). The groove 80 is formed with a support surface 86 for the pin end 78 (similar to surface 68 in FIG. 4). An elongated radial seal pin 88 (of substantially uniformly round cross-sectional shape) is also relatively loosely seated in a substantially radially-oriented groove 90 that is formed on the same side of the shank portion 82 of the first bucket 84. In this particular arrangement, referred to as a double-wedge style damper pin, the damper pin 74, in use, is engaged with an undercut or wedge surface 79 on the shank portion 82 of the first bucket and an undercut or wedge surface 92 on the shank portion 94 of the second adjacent bucket 96. The radial seal pin 84 in groove 90 is engaged with a flat surface 98 on the shank portion 94 of the adjacent bucket 96. The cooling fluid leakage path is shown at 100.

In FIG. 7, the damper pin 74, groove 80, reduced end 78 and support surface 86 are provided in the shank 102 of the first bucket 104, similar to the damper pin arrangement in FIG. 6. Now, however, a substantially radially-oriented radial groove 106 is formed in the shank portion 108 of the adjacent second bucket 110. Damper pin 74 projects beyond the groove 80 and remains engaged with the wedge surfaces 112, 114, respectively on the adjacent bucket shank portions, and the radial seal pin 88 in groove 106 is engaged with a flat surface 112 on the shank 102 of the first bucket 104. This allows the radial seal pin 88 to be located closer to the damper pin 74, so that the cooling fluid leakage path 115 in FIG. 7 is reduced relative to the leakage path 100 in FIG. 6.

Another comparison is shown in FIGS. 8 and 9 for a "single wedge" configuration. In FIG. 8, the damper pin 116 has a uniform, round cross-sectional shape and is relatively loosely seated in a substantially axially-oriented groove 118 in the shank portion 120 of a first bucket 122. The pin 116 is shown in an in-use orientation, engaged with an upper wedge surface 124 of the groove 118 and spaced from the lower surface 126 of the groove due to centrifugal forces. The radial seal pin 128 is relatively loosely seated in a substantially radially-oriented groove 130, also formed on the same side of the shank portion 120 of the bucket 122 as the damper pin groove 118. In this single wedge arrangement, the damper pin 116 engages a flat surface 132 on the shank portion 134 of the adjacent, second bucket 136, and the radial seal pin 128 is also engaged with the same flat surface 132. The cooling fluid leakage path is shown at 138.

In FIG. 9, another exemplary but nonlimiting embodiment of the invention is shown where the damper pin 116 and groove 118 in a shank portion 140 of a first bucket 142 are similar to the corresponding groove and pin arrangement in FIG. 7A. Here, however, the substantially radially-oriented groove 144 is formed in the shank portion 146 of the adjacent or second bucket 148. Damper pin 116, in use, remains engaged with the wedge surface 124 (and spaced from the lower groove surface 126) and a flat surface 150 on the adjacent or second bucket 148, while the radial seal pin 128 is engaged with a flat surface 152 on the first bucket 142. This arrangement also allows the radial seal pin 128 to be located closer to the damper pin 116, so that the leakage path 154 is now smaller than the leakage path 138 in FIG. 8.

It will thus be understood that each bucket in an annular row of similar buckets has a shank portion with two opposite sides. One side is formed with the substantially axially-oriented damper pin groove, and the opposite side is formed with at least one if not two substantially radially-oriented seal pin grooves (radial seal pins in certain turbine configurations may be installed only on the leading edge of the bucket or blade). In this way, the adjacent shank portions of any pair of buckets will appear as shown and described in connection with FIGS. 4, 5, 7 and 9. It will also be understood that the invention is not limited to the specifics of the examples described in connection with FIGS. 6B and 7B. Rather, the invention has wide applicability to various bucket and shank configurations, the constant being the location of damper and radial seal pins on opposite sides of the bucket shank portion. In addition, the invention is not limited to specific damper pin and/or seal pin shapes.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A bucket pair in a turbomachine comprising:
   a first bucket having a first airfoil portion and a first shank portion, wherein the first shank portion has an outer planar surface;
   an adjacent bucket having a second airfoil portion and a second shank portion adjacent said first shank portion, wherein the second shank portion has an outer planar surface;
   a substantially axially-oriented groove in said outer planar surface of the first shank portion;
   at least one substantially radially-oriented groove in said outer planar surface of the second shank portion and the substantially radially-oriented groove having a radially outer end overlapping the substantially axially-oriented groove of the first shank portion;
   an elongated damper pin seated in said substantially axially-oriented groove in said first shank portion, wherein said elongated damper pin abuts the outer planar surface of the second shank portion; and
   an elongated radial seal pin seated in said at least one substantially radially-oriented groove in said second shank portion, wherein the at least one elongated radial seal pin abuts the outer planar surface of the first shank portion, wherein said elongated radial seal pin abuts the outer planar surface of the first shank portion.

2. The bucket pair of claim 1 wherein said elongated damper pin includes at least a section round in cross-section.

3. The bucket pair of claim 2 wherein said at least one radial seal pin is includes a section round in cross-section.

4. The bucket pair of claim 3 wherein said at least one radial seal pin is located at a forward end of said second shank portion.

5. The bucket pair of claim 3 wherein said at least one radial seal pin overlaps a portion of the substantially axially-oriented groove.

6. The bucket pair of claim 5 wherein said elongated damper pin is engageable, in use, with angled wedge surfaces on each of said first and second shank portions.

7. The bucket pair of claim 1 wherein said elongated damper pin includes a middle portion which is uniformly round in cross-section and end portions each having cross-sections smaller in area than the cross-section of the middle portion.

8. The bucket pair of claim 7 wherein said cross-sections of the opposite ends are substantially semi-circular.

9. The bucket pair of claim 1 wherein said elongated damper pin is engageable, in use, with angled wedge surfaces on each of said first and second shank portions.

10. The bucket pair of claim 2 wherein said elongated damper pin is engageable, in use, with an angled wedge surface on said first shank portion and said section of the damper pin is engageable the planar outer surface on said second shank portion.

11. A bucket for a turbomachine rotor wheel comprising:
    an airfoil portion, a shank portion and a dovetail mounting portion,
    said shank portion including opposite sides each having an outer planar surface, the outer planar surface of one of said sides including a substantially axially-oriented groove extending between forward and aft ends of said shank portion, and the outer planar surface of the other of said sides including a least one substantially radially-oriented groove,
    said substantially axially-oriented groove is adapted to receive an elongated damper pin, wherein said axially-oriented groove faces an outer planar surface of a shank portion of an adjacent bucket, and
    said at least one substantially radially-oriented groove is adapted to receive an elongated radial seal pin, to face an outer planar surface of a shank portion of an adjacent bucket, and overlap a substantially axially-oriented groove in the shank portion of the adjacent bucket, wherein said at least one substantially radially-oriented groove faces the outer planar surface of the one of said sides of said shank portion.

12. The bucket of claim 11 wherein said substantially axially-oriented groove includes raised supporting surfaces at opposite ends of said substantially axially-oriented groove.

13. The bucket of claim 11 wherein said at least one substantially radially-oriented groove comprises first and second substantially radially-oriented grooves at forward and aft ends of said shank portion, adapted to receive first and second radial seal pins.

14. The bucket of claim 11 wherein said substantially radially-oriented groove is located at said forward end of said shank portion.

15. The bucket of claim 11 wherein said substantially axially-oriented groove includes a flat support surface and an angled wedge surface.

16. A bucket and pin assembly for a turbine machine rotor wheel comprising:
    a bucket formed with an airfoil portion, a shank portion and a dovetail mounting portion, said shank portion including a first outer planar surface adapted to face a shank portion of an adjacent bucket and a second outer planar surface adapted to face a respective shank portion of another adjacent bucket, wherein the second and first outer planar surfaces are on opposite sides of the shank portion;

the first outer planar surface includes a substantially axially-oriented groove extending between forward and aft ends of said shank portion, and the second outer planar surface includes at least one substantially radially-oriented groove at a forward end of the bucket, wherein the first outer planar surface remains planar at locations aligned in a radial direction with the substantially radially-oriented groove and wherein the substantially radially-oriented groove extends radially to a location aligned in the radial direction with the substantially axially-oriented groove;

an elongated damper pin, wherein said elongated damper pin abuts an outer planar surface of a shank portion of the adjacent bucket, seated in said substantially axially-oriented groove, and a radial seal pin, wherein said radial seal pin abuts an outer planar surface of a shank portion of another adjacent bucket, located in said at least one substantially radially-oriented groove.

17. The bucket and pin assembly of claim 16 wherein said substantially axially-oriented groove includes raised supporting surfaces at opposite ends of said substantially axially-oriented groove.

18. The bucket and pin assembly of claim 16 wherein said shank portion is formed with a substantially flat surface radially inward of said substantially axially-oriented groove.

19. The bucket and pin assembly of claim 16 wherein said substantially axially-oriented groove includes a flat support surface and an angled wedge surface.

\* \* \* \* \*